Jan. 31, 1928. 1,658,005
N. E. METHLIN
PIECE OF ORDNANCE MORE PARTICULARLY ADAPTED FOR FIRING AGAINST AIRCRAFT
Filed Oct. 25. 1926 8 Sheets-Sheet 7

Inventor
Nicolas Emilien Methlin
By
Mauro, Cameron, Lewis & Kerkam
attorneys

Jan. 31, 1928. 1,658,005
N. E. METHLIN
PIECE OF ORDNANCE MORE PARTICULARLY ADAPTED FOR FIRING AGAINST AIRCRAFT
Filed Oct. 25, 1926 8 Sheets-Sheet 8

Patented Jan. 31, 1928.

1,658,005

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT-STOCK COMPANY OF FRANCE.

PIECE OF ORDNANCE MORE PARTICULARLY ADAPTED FOR FIRING AGAINST AIRCRAFT.

Application filed October 25, 1926, Serial No. 144,069, and in France December 10, 1925.

This invention relates to a piece of ordnance particularly adapted to firing against aircraft.

In my prior application Serial No. 72,743, filed December 2, 1925, there are described and illustrated various forms of construction of a piece of ordnance more particularly adapted for firing against aircraft. The main feature of this piece of ordnance is that the cradle is journalled at its rear end in bearings provided upon a platform which is movable about a pivot, the whole of the oscillating mass being supported on account of the fact that the cradle is connected, at a point near the centre of gravity of the said mass to a counterbalancing device so designed that for any angle of inclination of the oscillating mass, balance is practically obtained.

This invention relates to a form of this gun characterized by an arrangement which greatly facilitates the operations necessary for mounting the gun for transport purposes by means of a limber and hind carriage, use being made of the general features recalled above.

The new constructional form of the gun is essentially characterised by the fact that the platform is constructed in the form of a top carriage adapted to turn in a saddle itself movable, by means of a knee joint, in a pedestal carried by three arms two of which are pivotally mounted so as to be adapted to open out fan wise in order to be anchored to the ground while the third is integrally secured to the pedestal and may be provided at its free end, with an operating lever.

The gun thus constructed is combined, for the purposes of transport, with a hind carriage forming a supporting cradle for the gun and adapted to be placed beneath the arm integrally secured to the pedestal in order to slide this arm into the cradle on the axle of the carriage when the gun has been raised by means of the said lever. On account of the principle of construction adopted for the gun the latter may be raised in this way without effort, support being taken for the gun upon the ends of the two pivotally connected arms.

Then, the arm integrally secured to the pedestal being fitted into the axle of the hind carriage, the pivotal arms which are connected to each other may be raised after the gun has been rotated towards the rear carriage in order to assist in performing this raising operation.

An example of the gun thus designed is illustrated in the accompanying drawings.

The gun comprises a cradle B which is journalled at its rear end $b$ in bearings $d$, $d^1$ carried upon a support D which is movable about a pivot. The oscillating mass is wholly supported on account of the fact that the said cradle B is connected at a point $B^1$ near the centre of gravity of the said mass, to a spring counterbalancing device I—K so chosen that for any angle of inclination of the said mass balance is practically obtained.

The form of construction according to the present invention is essentially characterized by the feature that the support is constructed, in the manner known in itself, in the form of a top carriage adapted to turn by means of a pivot $D^1$ in a saddle or seating $D^2$ which is itself movable by means of a knee joint in a pedestal $D^3$.

Figure 8:
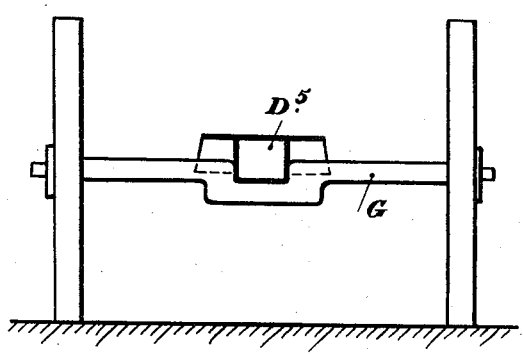
Figure 8 is a side elevation illustrating one form of carriage for supporting the gun and mounting.

This pedestal may be anchored to the ground by means of arms. According to the invention two of the three anchoring arms (D⁴, D⁴) are pivotally connected to the said pedestal while the third D⁵ is integrally secured to the said pedestal and is arranged so as to receive at its free end an operating lever E. The gun thus constructed is combined, for the purposes of transport by road, with a hind carriage the axle G of which forms a supporting and securing cradle for the arm D⁵, as shown clearly in Figure 8 which is a cross-sectional elevation of the hind carriage showing the gun in position for transport.

Figure 1:
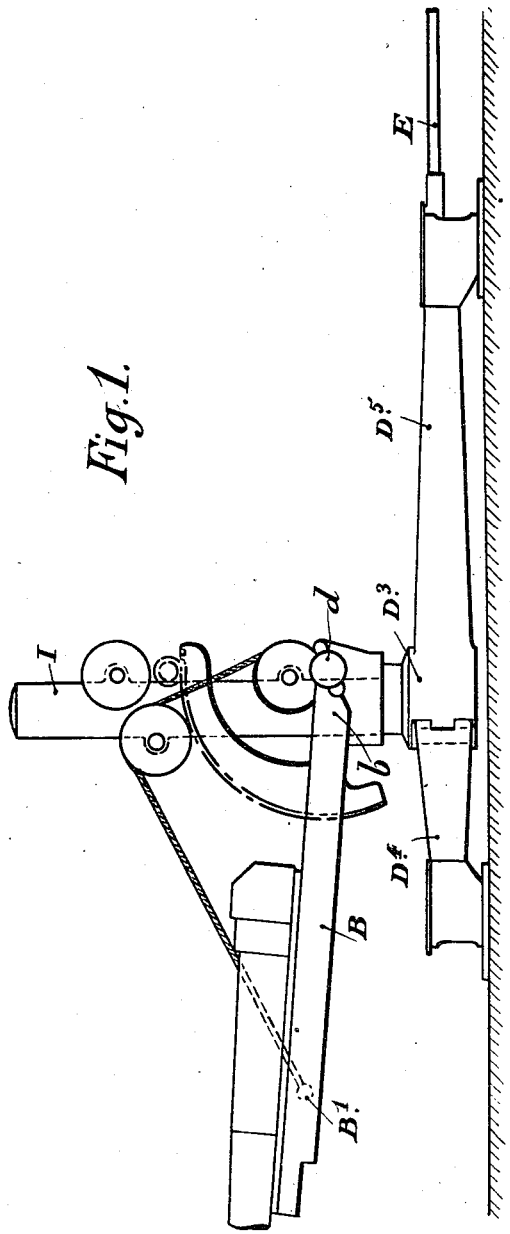
Figure 1 is a longitudinal elevation of the gun in battery position.

When it is desired to transport the gun, constructed for firing as shown in Figure 1, the anchoring trail-spade is withdrawn and the operating lever E is fitted into the arm D⁵. Care is naturally taken to bring the oscillating mass into the position shown in Figure 1, which position is nearly horizontal and practically in alignment or in alignment with the arm D⁵. On account of the position of the centre of gravity of the oscillating mass it is extremely easy to raise the gun by means of the lever E, support being taken upon the ground by the anchoring platform formed by the two arms D⁴, and this raising of the gun may be effected without a great force being exerted.

Figure 2:
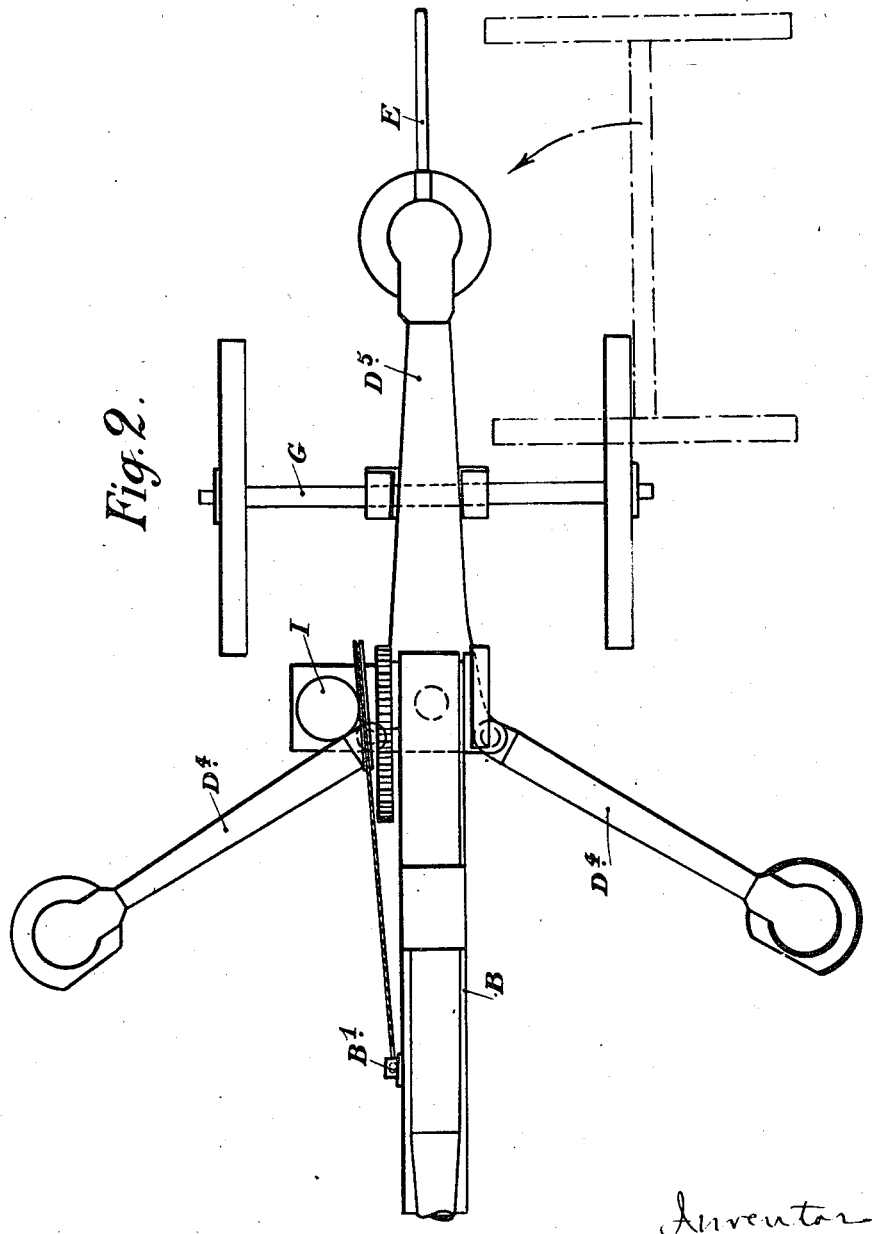
Figure 2 is a corresponding plan.
Figure 3:
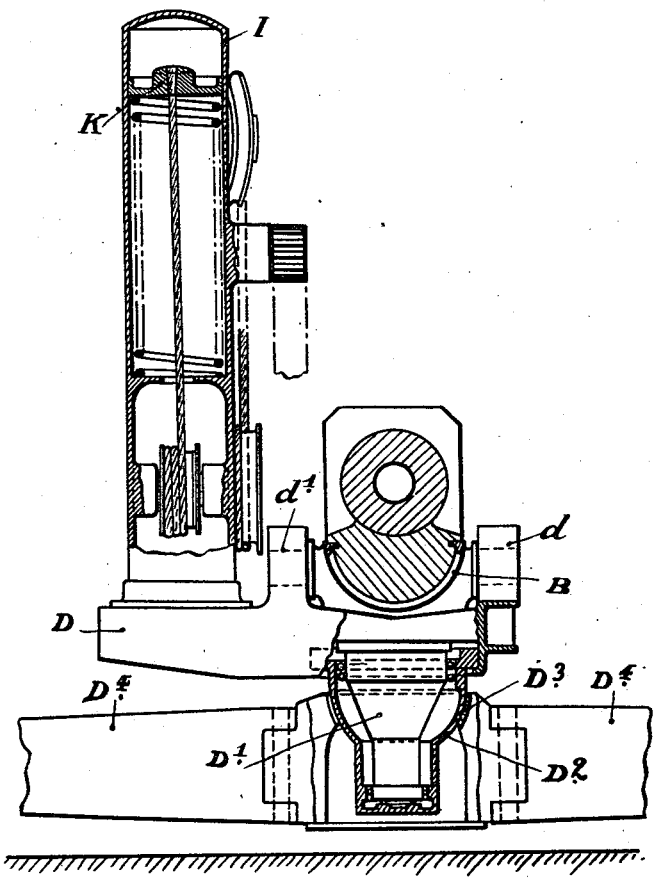
Figure 3 is a cross-sectional elevation to a larger scale taken along the line 3—3 in Fig. 1, looking from left to right, with portions conveniently cut away to allow the cylinder I and the pivot to be seen in section.
Figure 4:
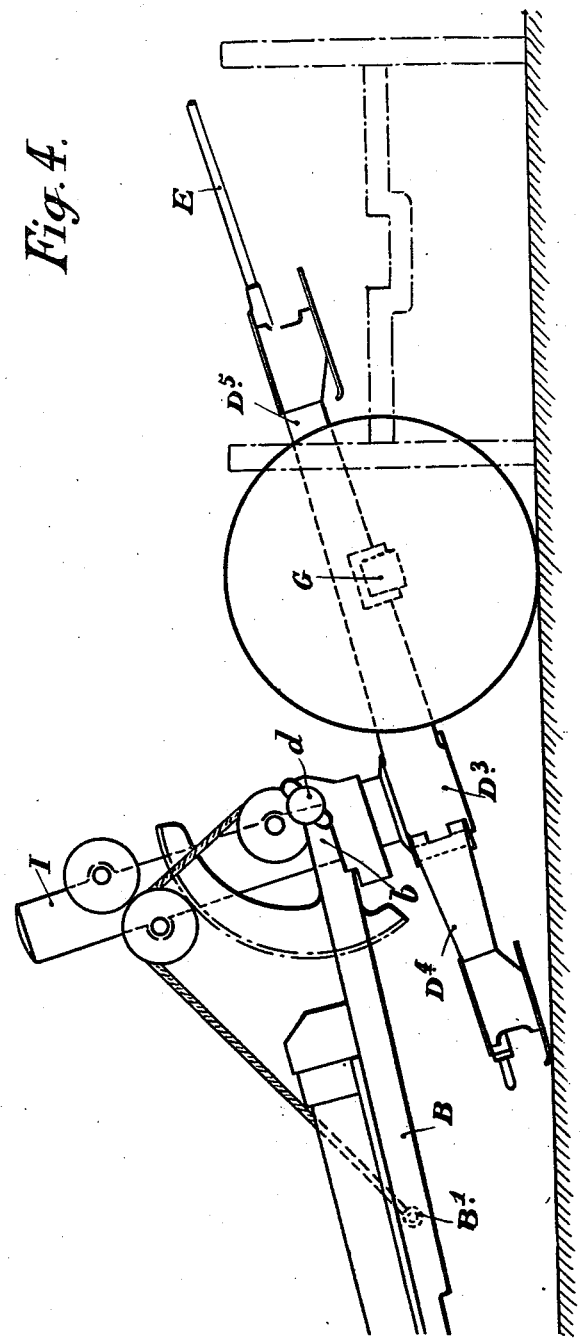
Figure 4 illustrates the operation of raising the gun for the purpose of fitting the arm integrally secured to the gun carriage pedestal into the supporting cradle upon the axle of the rear carriage.

When the gun is raised into the position shown in Figure 4 the hind carriage is placed beneath the lever, first in the position shown in dot and dash lines in Figures 4 and 2, then the hind carriage is turned in order to bring it into the position shown in full lines in the same figures, which enables, by suitably placing the arm D⁵, the latter to be fitted upon the axle G.

Figure 5:
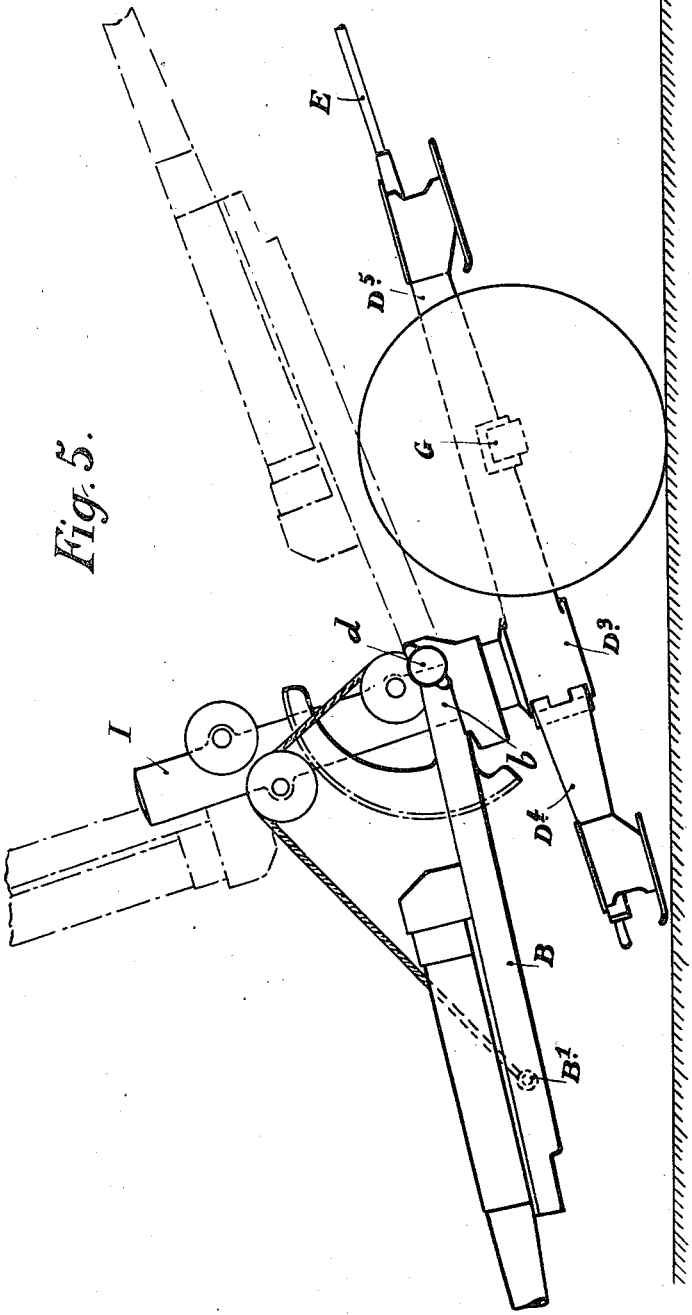
Figure 5 shows the different operations to be carried out in order to bring the oscillating mass into the position which will enable the whole of the apparatus to be swung by taking support upon the axle of the hind carriage.
Figure 6:
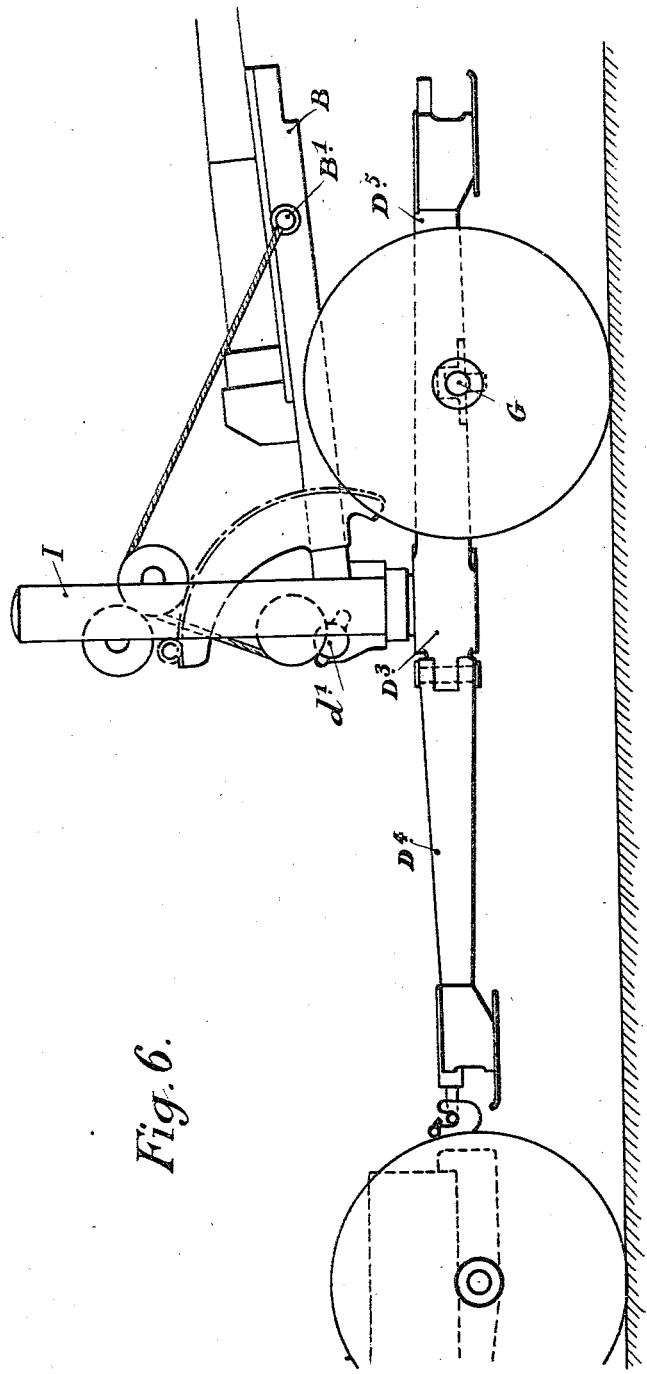
Figures 6 and 7 show in elevation and plan respectively the position occupied by the gun when mounted for travelling.

When this is done, the oscillating mass is brought into the position shown in dot and dash lines in Figure 5; to this end the said mass is righted by means of the vertical elevating mechanism which brings the centre of gravity of this mass near the axis of the pivot; then the mass is turned through 180° by means of the training mechanism. Then, still continuing to actuate the elevating mechanism, the oscillating mass is lowered into a position which is practically symmetrical with the one it occupied at the commencement of the operation and which is also shown in dot and dash lines in Figure 5.

Figure 7:
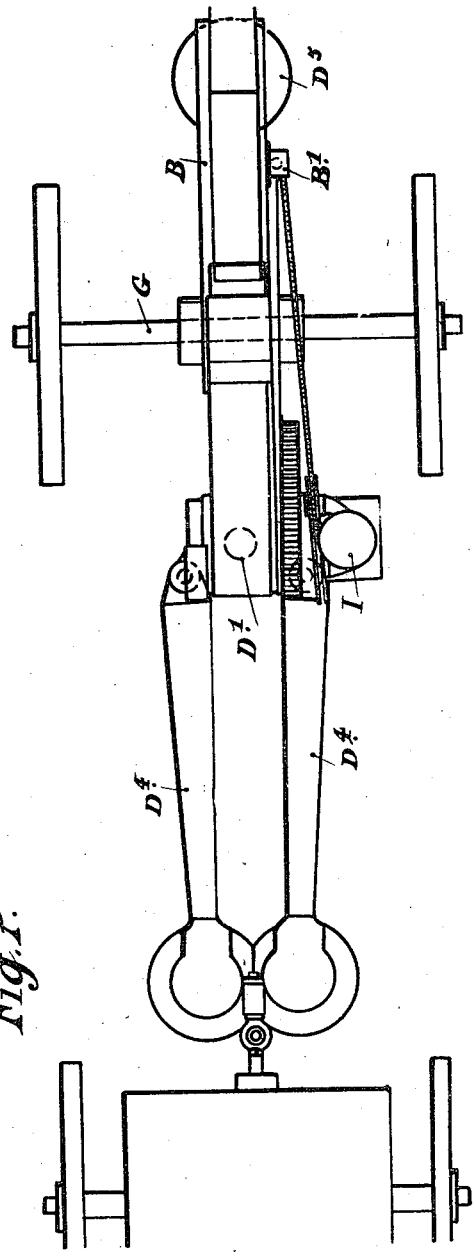

The lowering of the whole of the gun, by pivoting about the axis of the axle G, is then a very simple matter the centre of gravity of the arrangement being in the neighbourhood of the vertical line passing through the axis of the said axle. The two pivotally connected arms D⁴ are then drawn together in order that they may be connected together at their ends, as shown in Figure 7, by means of a pintle eye to a limber of known construction.

What is claimed is:

1. In combination with a gun of the type employing a cradle journalled at its rear end upon a support and a counterbalancing device for the gun and cradle, a pedestal, means for pivotally mounting said support on said pedestal, a plurality of arms connected to said pedestal, one of said arms being immovably secured thereto, an operating lever for said immovable arm, and a carriage having an axle for receiving said immovable arm, said pedestal being adapted to be tilted about the ends of certain of said arms by means of said operating lever whereby said axle may be operatively engaged with said immovable arm.

2. In combination with a gun of the type provided with counterbalancing means and a support, a pedestal on which said support is mounted, means interposed between said support and pedestal permitting movement of the support relative to the pedestal, a plurality of arms connected to said pedestal for anchoring the latter in firing position, one of said arms being rigidly connected thereto, a carriage having an axle for supporting said last named arm, and an operating lever adapted to be engaged with said rigidly connected arm for swinging said pedestal and the parts supported thereby about the ends of a plurality of said arms for engaging the rigid arm with said carriage.

3. In combination with a gun of the type provided with counterbalancing means and a support, a pedestal, means for pivotally mounting said support on said pedestal, a plurality of arms for anchoring said pedestal to the ground, certain of said arms being pivotally connected to the pedestal and another of said arms being rigidly secured thereto, an operating lever for the free end of said rigid arm, and a carriage adapted to be moved underneath and to support said rigid arm, said pedestal being tilted about the ends of said pivotal arms by means of said lever to move said carriage into operative engagement with said rigidly connected arm.

4. In combination with a gun of the type provided with means for counterbalancing the gun at any angle of inclination and a platform for supporting said gun and counterbalancing means, a pedestal, means for movably mounting said platform on said pedestal, a plurality of arms for anchoring said pedestal to the ground, a carriage having an axle adapted to engage and support one of said arms, and means for raising one of said arms into engagement with said axle, the center of gravity of the pedestal and elements supported thereby being brought closely adjacent the vertical plane of the axle of said carriage by moving said platform to bring said gun into approximate parallelism with said last-named arm.

5. In combination with a gun of the type provided with counterbalancing means and a platform for supporting the gun and counterbalancing means, a pedestal, a saddle for movably mounting said platform on said pedestal, a plurality of arms for anchoring said pedestal to the ground, one of said arms being rigidly secured to the pedestal, a carriage provided with an axle adapted to be moved underneath and to support said rigidly secured arm, and an operating lever for moving said arm into engagement with said axle, movement of the platform relative to the pedestal until the gun is in approximate parallelism with said rigidly secured arm serving to bring the center of gravity of the mass closely adjacent the vertical plane of said axle.

In testimony whereof I have signed this specification.

NICOLAS EMILIEN METHLIN.